United States Patent [19]

Hutson

[11] Patent Number: 5,761,685
[45] Date of Patent: Jun. 2, 1998

[54] METHOD AND SYSTEM FOR REAL-TIME INFORMATION ANALYSIS OF TEXTUAL MATERIAL

[76] Inventor: William H. Hutson, 47 Grange Ave., Box 221, Little Compton, R.I. 02837-0221

[21] Appl. No.: 717,757

[22] Filed: Sep. 23, 1996

Related U.S. Application Data

[63] Continuation of Ser. No. 462,129, Jun. 5, 1995, Pat. No. 5,559,940, which is a continuation of Ser. No. 238,375, May 5, 1994, abandoned, which is a continuation-in-part of Ser. No. 119,362, Sep. 10, 1993, Pat. No. 5,379,268, which is a continuation of Ser. No. 978,245, Nov. 18, 1992, Pat. No. 5,245,587, which is a continuation-in-part of Ser. No. 628,337, Dec. 14, 1990, Pat. No. 5,175,710.

[51] Int. Cl.$^6$ .................................................. G09G 5/26
[52] U.S. Cl. ................................ 707/526; 707/529
[58] Field of Search ........................... 707/517, 526, 707/527, 528, 529, 530, 531

[56] References Cited

U.S. PATENT DOCUMENTS

| 3,894,348 | 7/1975 | Fontaine | 340/728 |
|---|---|---|---|
| 4,736,199 | 4/1988 | Chadwick et al. | 434/9 |
| 4,839,853 | 6/1989 | Deerwester et al. | 364/900 |
| 4,965,732 | 10/1990 | Roy, III et al. | 364/460 |
| 4,973,111 | 11/1990 | Haacke et al. | 324/309 |
| 4,995,011 | 2/1991 | Spiesberger | 367/127 |
| 5,001,747 | 3/1991 | Sexton | 379/410 |
| 5,010,504 | 4/1991 | Lee et al. | 365/574 |
| 5,031,155 | 7/1991 | Hsu | 367/25 |
| 5,109,863 | 5/1992 | Semmlow et al. | 128/715 |
| 5,175,710 | 12/1992 | Hutson | 367/135 |
| 5,245,587 | 9/1993 | Hutson | 367/135 |

(List continued on next page.)

OTHER PUBLICATIONS

Schmidt, "Multiple Emitter Location and Signal Parameter Estimation", Mar. 1986.

Carroll et al., "Models and Methods for Three-Way Multi-dimensional Scaling", 1974.

Owsley, Enhanced Minimum Variance Beamforming, Nov. 18, 1988.

Marple, Jr., "Digital Spectral Analysis", 1987.

Kung, Warp Demo, Aug. 29, 1986.

(List continued on next page.)

Primary Examiner—Phu K. Nguyen
Assistant Examiner—Cliff N. Vo
Attorney, Agent, or Firm—Hale and Dorr LLP

[57] ABSTRACT

A multi-dimensional processing and display system that is used with textual data to provide a system by which large volumes of such textual data may be efficiently sorted and searched. Textual data that is input to the multi-dimensional processing and display system is from one or more documents that are reformatted and translated into one or more numeric matrices. The matrices are modified to enhance and/or suppress certain words, phrases, subjects, etc. Thereafter, a single two-dimensional data is formed by concatenating the numeric matrices. The multi-dimensional processing and display system creates and maintains a historical database which is also concatenated in the two-dimensional matrix. Once the textual data is in the form of a two-dimensional matrix, the data can be analyzed efficiently, for example, using singular value decomposition (SVD). In doing so, the two-dimensional concatenated matrix is decomposed to obtain a compressed form of the numeric matrix. Certain data elements in the two-dimensional matrix may be enhanced, while certain other data elements may be suppressed. After data enhancement and/or suppression, the two-dimensional matrix is partitioned and rearranged to form an enhanced multi-dimensional matrix. All or portions of the enhanced multi-dimensional matrix are then visually displayed. Lexical, semantic, and/or textual constructs of interest may be displayed as opaque objects within a three-dimensional transparent cube, enabling a user to review many documents quickly and easily.

12 Claims, 4 Drawing Sheets

U.S. PATENT DOCUMENTS

| | | | |
|---|---|---|---|
| 5,379,268 | 1/1995 | Hutson | 367/100 |
| 5,455,806 | 10/1995 | Hutson | 367/100 |
| 5,559,940 | 9/1996 | Hutson | 395/151 |

OTHER PUBLICATIONS

Comon, "An Array Processing Technique Using the First Principal Component", Nov. 1987.

Chayka, "Project 96050 Automated Processing of Complex Signal Environments FY86 Final Report", Nov. 1987.

Weiss et al., "MIT Industrial Liason Program Report", Oct. 23, 1987.

Callaerts et al., "On–Line Algorithm for Signal Separation Based on SVD", 1988.

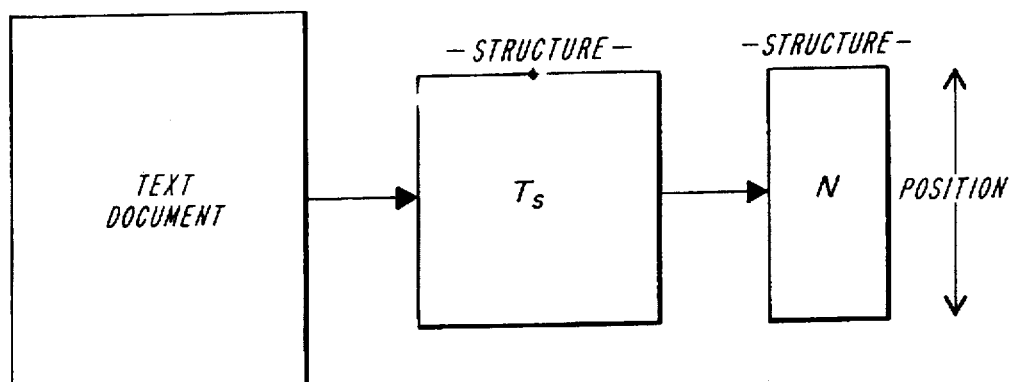
*FIG. 1*
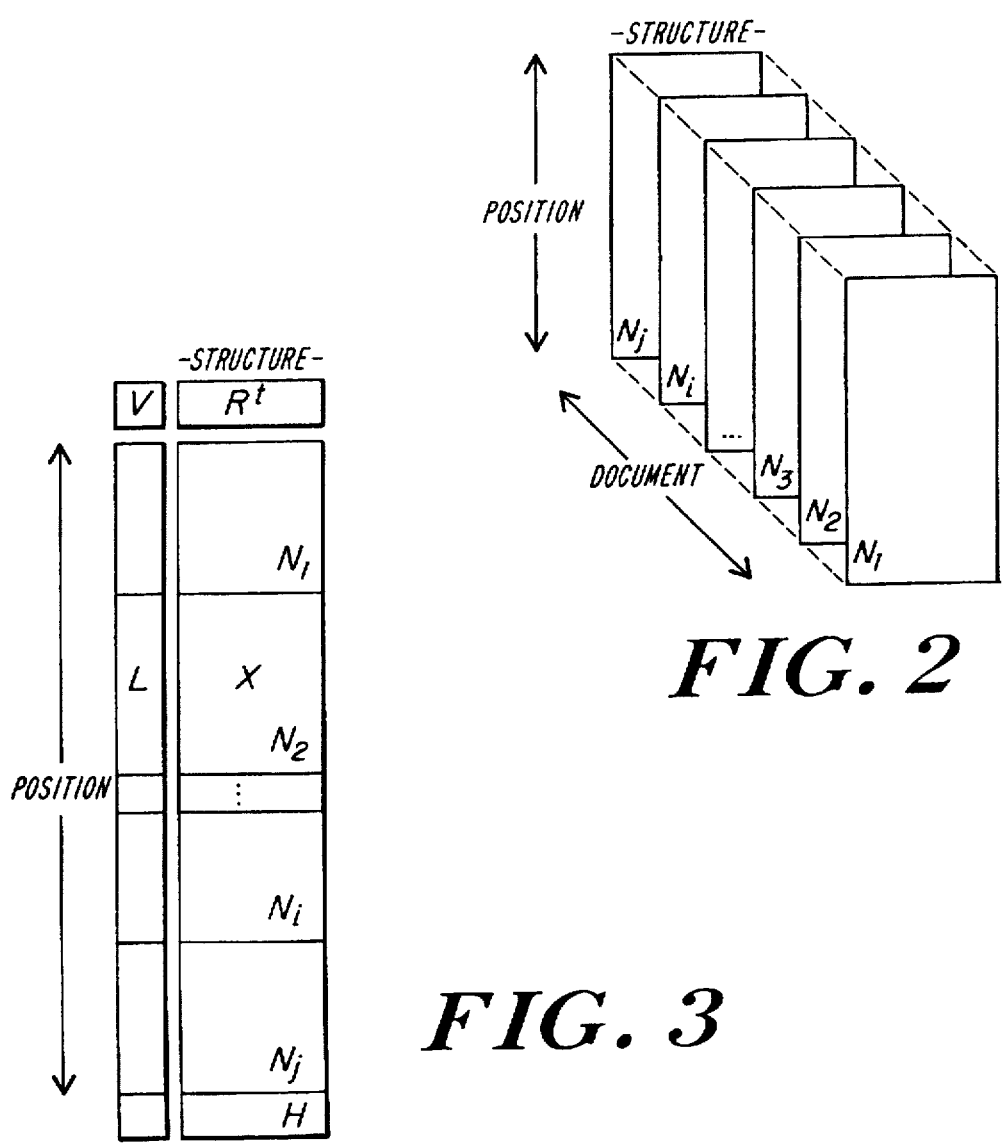
*FIG. 2*
*FIG. 3*

METHOD AND SYSTEM FOR REAL-TIME INFORMATION ANALYSIS OF TEXTUAL MATERIAL

RELATED APPLICATIONS

The present application is a continuation of application Ser. No. 08/462,129, now U.S. Pat. No. 5,559,940 filed Jun. 5, 1995; which is a continuation of application Ser. No. 08/238,375, filed May 5, 1994 now abandoned; which is a continuation-in-part of U.S. patent application Ser. No. 08/119,362, filed Sep. 10, 1993, now U.S. Pat. No. 5,379,268, which is a continuation of U.S. patent application Ser. No. 07/978,245, filed Nov. 18, 1992, now U.S. Pat. No. 5,245,587, which is a continuation-in-part of U.S. patent application Ser. No.07/628,337, filed Dec. 14, 1990, now U.S. Pat. No. 5,175,710.

FIELD OF THE INVENTION

The invention relates to computer-based analysis and information retrieval and, in particular, to the rapid access, analysis, and visualization of only desired textual material stored in computer files.

BACKGROUND OF THE INVENTION

Recent advances in digital communications and computer storage capacity, and processing power have provided the user with ever-increasing access to vast amounts of textual and other types of data. This also has created an increasing need to reliably sort such data for desired information it contains. This need for efficient sorting of data is ever more important because as the amount of textual data increases, the sorting of such textual data increases exponentially.

The problem described above is not solved by faster computer processors and more efficient computer storage. In fact, these suggested remedies only compound the problem.

As there is increasing access to larger amounts of data, it may overload the ability to effectively process such information for use. In fact, this massive increase in data may result in a form of "data pollution." Thus, while a potential user may be interested in a subject, he or she may not have the time, resources, nor inclination to read through the extremely large number of articles on the subject. What they actually desire is to obtain the basic information on a subject and then any additional articles that present new or different information on the subject of interest.

To properly access a database today, a user needs to explicitly formulate and specify highly structured inputs. Often, it is necessary for a user to be trained in how to use a particular database retrieval system. That is, how to formulate a proper query, and what words or phrases to use to efficiently access the database. Unfortunately, the focus often becomes the database retrieval system itself, rather than the information it contains. The larger the database, the less likely a casual user is able to get the information he or she actually desires, at least not without considerable difficulty.

Noting the above, improvements in database retrieval systems gives us access to larger amounts of information, but this access can quickly result in information overload. Moreover, the user's unfamiliarity with particular computer systems also results in incorrect choices of keywords, improper specificity of semantic relationships, or inexact context descriptions. A user, therefore, is often inundated with large amounts of redundant and often worthless information.

The present invention overcomes these problems as demonstrated in the remainder of the specification and the attached drawings.

SUMMARY OF THE INVENTION

The present invention is a multi-dimensional processing and display system that is used with textual data in machine-readable form, e.g., ASCII text files, optical character recognition of scanned textual material, speech recognition of acoustic information, etc.

Textual data that is input to the multi-dimensional processing and display system of the present invention is from one or more documents that are reformatted and translated into numeric form and placed in one or more matrices. The matrices are modified to enhance and/or suppress certain words, phrases, subjects, etc. This multi-dimensional matrix form of textual data is then separated into a number of matrices of two-dimensional data which are concatenated together along a common dimension to form one large two-dimensional matrix.

The multi-dimensional processing and display system of the present invention creates and maintains a compressed, historical database which is also concatenated with the two-dimensional matrix. This database allows certain lexical, semantic, and/or textual constructs to be enhanced and other constructs to be suppressed.

Once the textual data is in the form of a two-dimensional matrix, the data can be analyzed efficiently using, for example, singular value decomposition (SVD). The two-dimensional concatenated matrix is decomposed to obtain a compressed and enhanced form of the numeric matrix. In the preferred embodiment, singular vectors and singular values are obtained. Singular vectors are partitioned into one or more groups on the basis of their corresponding singular values, or other selected criteria.

One or more groups of the singular vectors are analyzed further to determine, analyze, and identify semantic, lexical, and/or textual constructs of interest. Selected singular vectors may be compared with prior results, or be "searched," for example, in the form of a database query.

Certain data elements in the two-dimensional matrix are enhanced, while certain other data elements are suppressed. In the preferred embodiment, this is accomplished by modifying the singular values within each of the groups of singular vectors to enhance certain lexical, semantic, and/or textual constructs and to diminish other features within the textual data.

An enhanced, two-dimensional matrix is generated by multiplying together the diagonal matrix of modified singular values and singular vector matrices. The two-dimensional matrix has enhanced data values associated with certain lexical, semantic, and/or textual constructs of interest.

After data enhancement, the two-dimensional matrix is partitioned and rearranged to form an enhanced multi-dimensional matrix. All or portions of the enhanced multi-dimensional matrix are then visually displayed. The preferred embodiment displays lexical, semantic, and/or textual constructs of interest as opaque objects within a three-dimensional transparent data cube, enabling a user to review many documents quickly and easily.

It is an object of the present invention to rapidly access subject material, and be able to continually and efficiently absorb information, yet enable a user the opportunity to review new material on a topic without having to read and sort through many similar textual articles.

It is another object of the present invention for a user to use common and flexible forms of input to guide data queries, such as a brief description, a related article, or a portion thereof.

It is a further object of the present invention to continuously input textual data, analyze it, sort through it for pertinent information and important relationships, and "digest" it for later analysis and retrieval.

A still further object of the present invention is for a user to rapidly visualize material to quickly assess its importance and where to look to find information of interest.

A yet further object of the present invention is to enable a user to have general access and utilize familiar means of identifying subjects of interest, to be able to interactively modify, change, and exclude information in his or her search and to quickly see the results of these changes.

BRIEF DESCRIPTION OF THE DRAWINGS

FIG. 1 shows a text document and its corresponding structured and numeric matrices.

FIG. 2 shows multiple documents arranged as a stack of two-dimensional matrices.

FIG. 3 shows the singular value decomposition of a concatenated, numeric matrix, X.

DETAILED DESCRIPTION OF THE DRAWINGS

Figure 4:
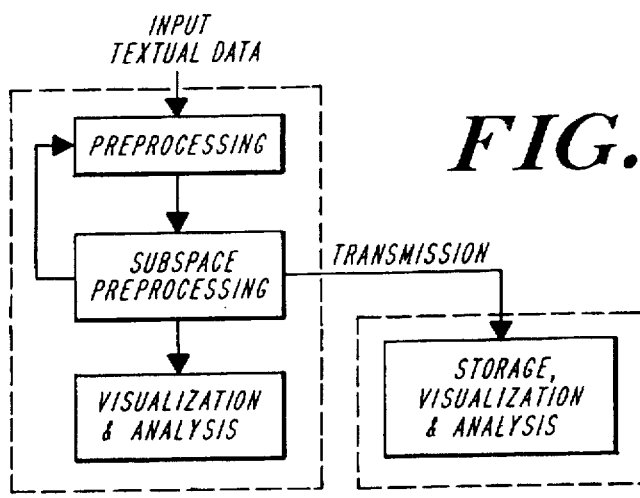
FIG. 4 shows the flow diagram for operation of the system of the present invention.

The present invention is a "real-time" data retrieval system that may be continuously updated as new textual information becomes available. The present system processes input textual data in real-time, analyzes it, reduces or eliminates unwanted data, and enhances lexical, semantic, and/or textual features of interest.

Referring to FIG. 1, the original text document is on the left, its semantically and syntactically modified form, $T_r$, is in the middle, and its converted, numeric form, N, is on the right. The semantically and syntactically modified form of the original documents, $T_r$, is converted into matrices $T_s$ and N that have the dimensions sentence structure by position within the document. Specifically, each row in the matrices correspond to a sentence. It is contemplated, however, that alternative embodiments may use other structural constructs.

Referring to FIG. 2, multiple documents may be transformed into matrices and stacked to form a three-dimensional matrix, with the dimensions sentence structure determined by position by document. Although the documents in FIG. 2 are the same length and width, other embodiments may have documents with variable dimensions.

In FIG. 3, in general, the textual data from FIG. 2 is rearranged and concatenated together along with historical information, H, into a single, two-dimensional matrix. Singular value decomposition (SVD) is used to decompose the matrix into its lexical, semantic, and/or textual structures, $R^r$, their relative importance in the document, V, and relative position in the documents, L.

Matrix analysis using singular values and singular vectors is well known, for example, in the following publications which describe such matrix analysis: Digital Spectral Analysis with Applications, S. L. Marple, 1987; Matrix Computations, G. H. Golub and C. F. Van Loan, 1989; "Singular Value Decomposition and Least Squares Solutions," Numerical Math, G. H. Golub and C. Reisch, 1970; LINPAC User's Guide, J. J. Dongerra, et. al., 1979; and "An Improved Algorithm for Computing Singular Value Decomposition," T. F. Chan, Communications of the ACM, 1982.

Referring again to FIG. 3, taking, for example, document $N_2$, the textual data is represented in a matrix X containing elements arranged in a two-dimensional format with each row corresponding to a single sentence and the elements in each row corresponding to the relative importance of the textual pattern in the text, based on a lexical dictionary or other text-to-numeric translation. This matrix can be decomposed, as described in the above references, into singular vectors and singular values. The right singular vectors are arranged in the rows of the matrix $R^r$ and describe textual features in terms of their lexical, semantic, and/or textual structures. The left singular vectors are arranged in the columns of the matrix L, which describe the textual features in terms of their position within the documents. The singular values are arranged along the principal diagonal in the matrix V and describe the magnitude of the associated textual features. Textual information in the matrix X, which contains a numeric form of input textual data, can be represented by its singular vectors, L and $R^r$, and its singular values, V. The relative importance of the raw textual data thus can be represented in a substantially compressed form.

The singular values and/or singular vectors are used by the realtime multi-dimensional text processing system of the present invention to monitor, analyze, compare, and enhance and/or suppress features within the textual matrix, X. The right singular vectors, $R^r$, correspond to textual structures and may be used for the identification and analysis of textual features of interest. The left singular vectors, L, correspond to the relative location of the associated textual features within the matrix X. The singular values, V, are displayed in a diagonal form and may be modified to enhance or suppress the importance of selected singular vectors.

The left singular vectors, L, right singular vectors, $R^r$, and singular values, V, are used to represent important features within the input data, but in a substantially compressed form. This allows the data to be easily indexed, analyzed, and visualized; however, saving substantial amounts of effort and computing time. This compression can reach as much as 98% of the original input data.

In the preferred embodiment of the present invention, the data processing system uses SVD to describe textual features, to suppress or remove unwanted features, and to identify, isolate and visualize features of interest. It also is contemplated that eigenvector decomposition (EVD) of the cross-product matrix of the matrix X may be used. The cross-product of the data matrix X is either $X^rX$ or $XX^r$. Eigenvector decomposition is also well known in the prior art.

As discussed, the present invention converts and stores data from textual sources in matrix format. Each document or textual matrix would be converted into two-dimensional numeric form, with the dimensions being sentence structure by position within the document. Alternatively, the textual data may be reformatted into other forms or formats. As shown in FIG. 2, the two-dimensional matrices are stacked together, creating an textual "data cube." The dimensions of this three-dimensional data cube are sentence structure by position by document. The relative importance of the textual material can be determined by visualizing (or reading) the value stored in the data cube at any given sentence location, textual segment, and document.

Referring to FIG. 4, a flow chart for operation of the present invention is shown. According to the flow chart, textual data is received and modified by the Preprocessing Function. This modification is to change it from a textual to numeric form. In doing so, the textual data is reformatted and concatenated together along with historical data into a two-dimensional matrix. Next, the two-dimensional data matrix is decomposed by the Subspace Processing Function, for example, into its singular values and singular vectors. Following this, selected results of the Subspace Processing Function are passed to the Analysis Function within the Visualization & Analysis Function, where they may be analyzed further (for example, with text queries) and/or expanded into their full matrix form for visual display. Finally, the results of the Analysis Function are passed onto the Data Visualization Function within the Visualization & Analysis Function, where the results are visualized, for example, as opaque objects within a three-dimensional data cube.

Referring again to FIG. 4, in other embodiments of the present invention, the results of Subspace Processing, in the form of left singular vectors, right singular vectors, and/or singular values, may be transmitted to a remote location for storage, retrieval, analysis, and display, such as that which would be associated with a database query.

Also, according to the system of the present invention, the textual information is passed in a forward direction through these functions, information is also passed back to assist in enhancement and monitoring features of interest. The data that is passed back is historical data in compressed form.

Historical data consists of a special set of lexical, semantic, and/or textual features of interest, which have been previously calculated by the Subspace Processing Function. The historical data is passed back to the Preprocessing Function to be concatenated with new textual data. The purpose of this feedback is to reinforce features of interest to the point where such features of interest may be enhanced and further distinguished from background material (i.e., "noise").

The Preprocessing Function.

Figure 5:
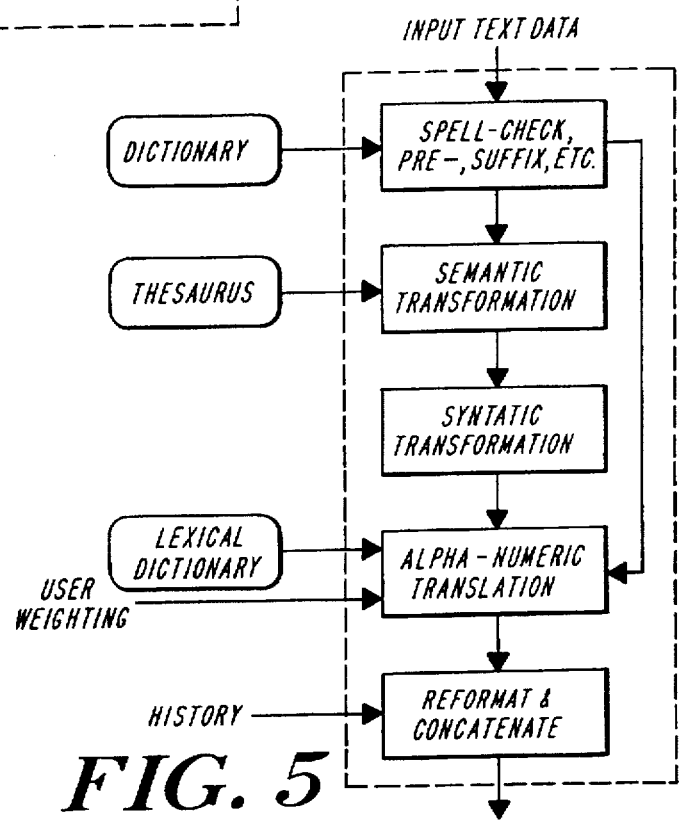
FIG. 5 shows the flow diagram of the Preprocessing Function.

FIG. 5 shows the Preprocessing Function in greater detail. This Function modifies the input textual data and translates it into numeric form. The textual data is checked for spelling errors and corrected where necessary. Prefixes and/or suffixes are identified and eliminated, if required. This information also is passed forward to the Alpha-Numeric Translation Function to guide subsequent weighting of the data. In addition, punctuation, italized, and emboldened words are identified and this information is similarly passed on for subsequent weighting. Information concerning tables, figures, and lists also is passed on to the Alpha-Numeric Translation Function.

A thesaurus or comparable dictionary is used to modify the text into a user-selectable "standard" semantic form, for example, using synonyms (similarity), hyponyms (inclusion), antonyms (opposites - for plus/minus weighting), etc.

Thereafter, the sentences are transformed into a more structured, syntactic form, such as S-V-O (i.e., subject, verb, object), or other comparable formats. For example, the modified text is then converted into numeric form, using a lexical dictionary in which, for each word, there is a corresponding number to reflect its relative importance. This lexical dictionary may vary in composition. For example, one form of lexical dictionary is based on the relative frequency of the word in common usage. In this case, the corresponding value reflects the uniqueness of the word. As such, the less common the word, the greater its numeric value. Such a lexical dictionary tends to emphasize relatively rare or unique words, phrases, etc. In an alternative embodiment, other user-selectable lexical dictionaries may be chosen, for example, to give greater emphasis to certain, user-selected keywords and phrases. Furthermore, the user can indicate certain terms, phrases, and/or sections of the document to be enhanced or suppressed.

The final step in the Preprocessing Function is to concatenate the text matrices, N, along with history data, H, which are the right singular vectors of textual features of interest, or textual features not of interest from prior analyses.

It also is understood that other formats may be used and still be within the scope of the present invention. For instance, the numeric matrix can be in other formats, such as a series of numbers to represent a matrix element.

History Data

Historical data for features of interest, $R'_{fi}$, and features not of interest, $R'_{fn}$, are continuously updated by the Subspace Processing Function and are passed back to the Preprocessing Function. The history data of features of interest are in the form of right singular vectors, $R'_{fi}$, which are determined through analysis of the singular values or other predetermined criteria in the Subspace Processing Function or Visualization & Analysis Function and represent highly compressed representations of textual information. The historical data of the features of interest $R'_{fi}$, and features not of interest, $R'_{fn}$, are scaled and concatenated with the weighted textual data in the two-dimensional data matrix. Alternatively, the historical data also may be selected by the Visualization & Analysis Function. The history database contains historical data that shows the status of the textual data from previous analyses or documents.

Figure 6:
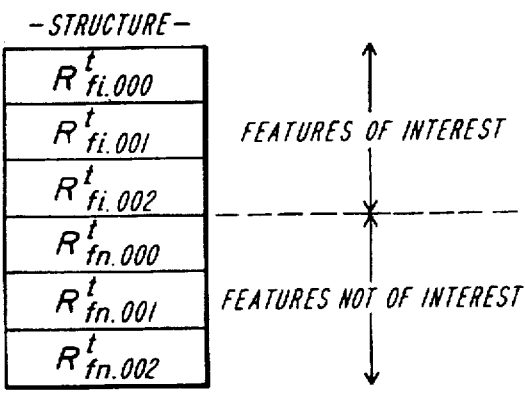
FIG. 6 shows the historical database of features of interest and features not of interest.

Referring to FIG. 6, the history database is updated by storing the most recently received history data of features of interest, $R'_{fi,000}$, and features not of interest, $R'_{fn,000}$. Every subsequent time interval, the history data of features of interest, $R'_{fi,000}$, are "passed back," or stored in the database to represent the recent historical status of the textual data. This data then becomes $R'_{fi,001}$. In a similar manner, $R'_{fi,001}$ is passed back and becomes $R'_{fi,002}$, and so on. History data of features not of interest, $R'_{fn}$, are maintained and updated in a similar manner.

The present invention creates and maintains historical databases, which is efficiently maintained in compressed and enhanced form, and represents the textual data from previous analyses or documents. Each new analysis includes the compressed and enhanced historical data, which is equivalent to a complete analysis of the full (uncompressed) historical data, yet at a fraction of the computational cost.

Referring again to FIG. 4, after obtaining a combination of concatenated data and compressed history in the form of a two-dimensional matrix, the Subspace Processing Function performs a singular value decomposition of the two-dimensional matrix.

Figure 7:
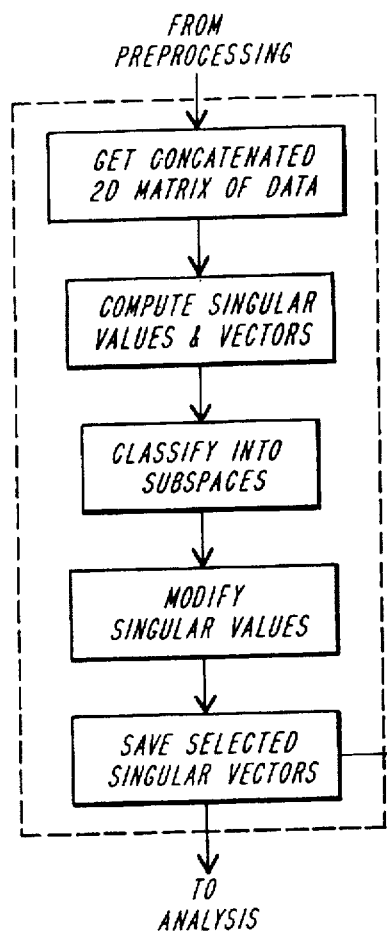
FIG. 7 shows the flow diagram of the Subspace Processing Function.

FIG. 7 shows the Subspace Processing Function in greater detail. The Subspace Processing Function computes singular vectors and singular values of the matrix X. After this, the singular vectors are classified into subspaces based on the magnitudes of their corresponding singular values or by some other predetermined criteria. In the preferred embodiment, singular vectors are classified into one of three general categories: features of interest; features not of interest; and other, unimportant features (i.e., "noise"). There may be different subspace categories in alternative embodiments. Furthermore, in alternative embodiments, preliminary classifications may occur in the Subspace Processing Function, while additional classifications may occur in the Visualization & Analysis Function.

Visualization & Analysis Function

Figure 8:
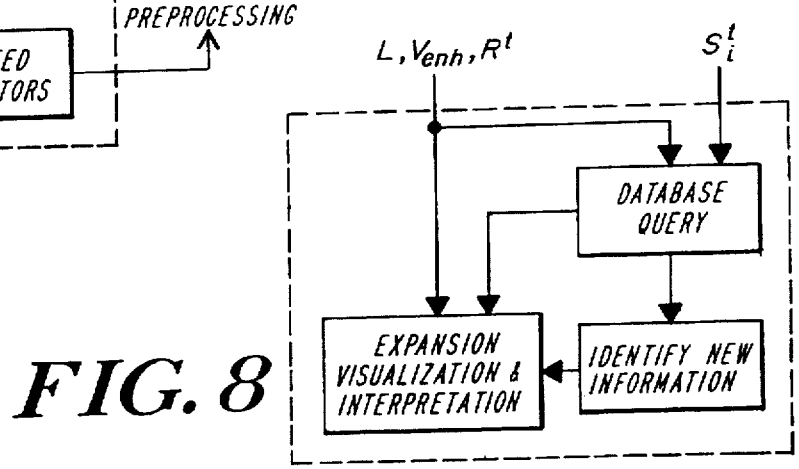
FIG. 8 shows the flow diagram of the visualization Analysis Function.

Referring again to FIG. 4, after processing by the Subspace Processing Function, the compressed textual data is passed on to the Visualization & Analysis Function. This function performs analysis, expansion, visualization, and interpretation of the expanded textual data as shown in FIG. 8. This involves an expansion, visualization, and review of features of interest characterized by the right singular vectors, $R^t$. In alternative embodiments, features not of interest may be simularly expanded visualized, and reviewed. According to the preferred embodiment, the left and right singular vectors, L and $R^t$, and modified singular values, $V_{enh}$, are expanded into their full, enhanced matrix form, $X_{enh}$:

$$X_{enh} = L \, V_{enh} \, R^t$$

The enhanced matrix $X_{enh}$ is then separated into documents and reformatted into a three-dimensional data cube.

Figure 9:
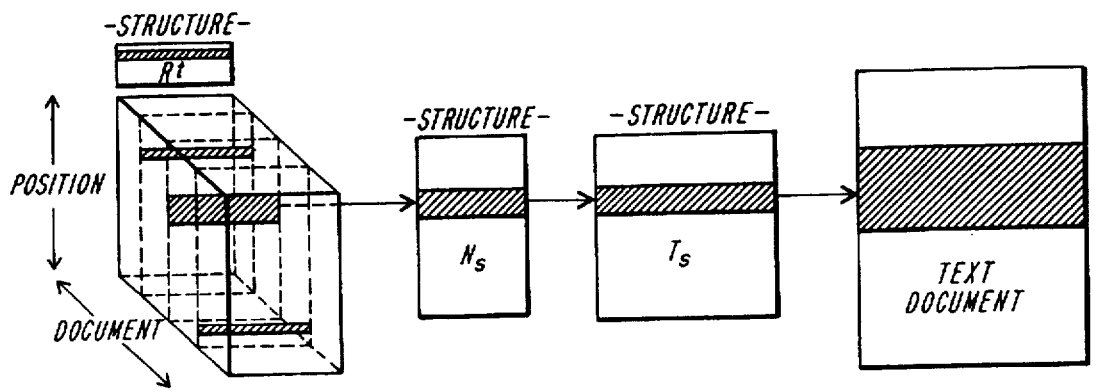
FIG. 9 shows visualization and interpretation of results.

FIG. 9 shows the three-dimensional data cube that is visually displayed. The features of interest may be viewed as opaque features in a transparent cube. In this manner a user can quickly review the visual representation of many documents in the document database with regard to what he or she desires to see.

The three-dimensional cube can be rotated and displayed from different perspectives or sliced along a plane within the data cube. The transparent cube contains enhanced three-dimensional data, and displays features in text matrix format. In other embodiments, the enhanced data may be thresholded, or otherwise modified.

The screen display includes cursors, which allow a user to freely "travel" through the cube, displaying the textual data in any document as a "slice," or plane, through the cube.

The user interprets a particular structure by selecting a representative lice and the corresponding documentation in the form of the associated structured textual matrix and/or associated document.

Database Query

Referring again to FIG. 8, a second form of analysis of the data is shown. Database query involves a query into what a user is looking for regarding a subject of interest. The preferred method of the present invention is illustrated to FIG. 10.

Figure 10:
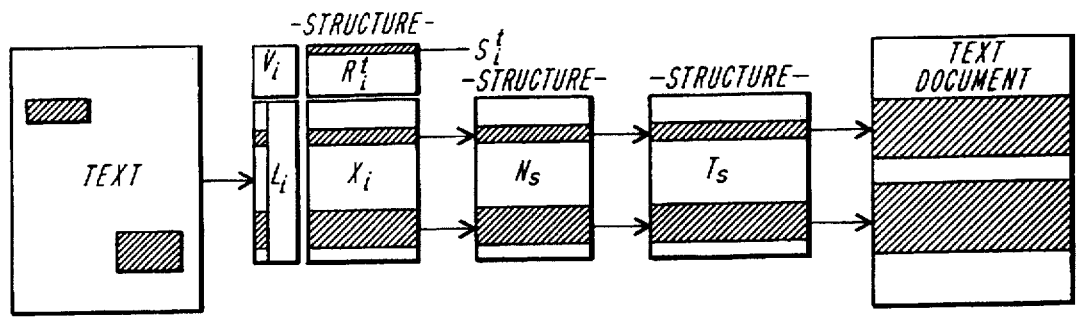
FIG. 10 shows a database query.

Referring to FIG. 10, the user would highlight those portions of the text which referred to a topic or topics of interest. This would ensure that these sections would be given more weight in subsequent processing. The user also could input keywords, phrases, short descriptions, or other textual material to condition the query.

The user would use the present invention to analyze a numeric form of the article of interest, $X_i$, according to the process outlined in FIG. 4. The resulting left singular vectors, $L_i$, would indicate the relative location of the subject material in the text matrix associated with the topic of interest and would be used to identify a subset of the right singular vectors, $S_i^t$, which indicates the subject matter of interest. Thus, the singular vectors, $S_i^t$, represent a database query in a format automatically tailored for the rapid analysis of a full database of documents.

Referring again to FIG. 3, in the preferred embodiment, the document database would have been previously analyzed according to the present invention and would have an associated matrix of right singular values, $R^t$, which would characterize the lexical, semantic, and/or textual structure of the database. In the present invention, the user would "search" this compressed history of documents for similar structures, through the matrix operation:

$$R_s^t = (R^t S_i) S_i^t,$$

where $(R^t S_i)$ represents the correlation between the subject material of interest $S_i$ and the full, compressed data set, $R^t$. The resulting matrix $R_s^t$ represents those structures within the full database which are correlated with the subject material of interest. In addition, the user could further modify the singular values in $V_i$ to enhance features of interest, to suppress features not of interest, or to suppress or eliminate unimportant material ("noise"). The user also could further modify the singular vectors themselves, for example, through thresholding to provide predetermined effects.

Again referring to FIG. 9, the user can expand, visualize, and interpret the results of the "search" contained in $R_s^t$. Those documents with the most coverage of the subject of interest would visually stand out as opaque features within the data cube. The user would be able to quickly assess the number of documents containing the subject matter of interest and the detail of coverage.

Figure 11:
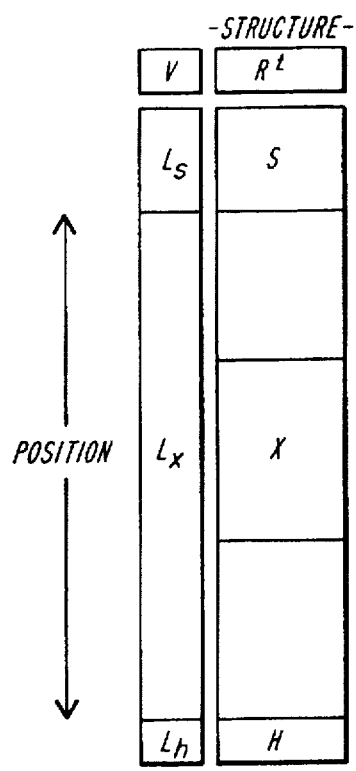
FIG. 11 shows another form of database query and identification of new information.

FIG. 11 shows an alternative embodiment in which a document containing subject matter of interest, S, would be concatenated to the document matrix, X. In the Subspace Processing Function, the left singular vectors associated with S (i.e., $L_s$) would indicate which structures describe features of interest. Furthermore, by scanning down the remaining left singular vectors, $L_x$, the user could quickly assess which other documents also contain the subject matter.

Identify New Information

Referring again to FIGS. 8 and 11, after the data query has been and processed, the user could quickly identify those articles which represent new information in the matrix X. Accordingly, after Subspace Processing, the matrix $L_h$ represents the correlation between lexical, semantic, and/or textual features in X and features of interest, H, from prior analyses. Those left singular vectors, $L_h$, with low correlation values (i.e., $L_{new}$, a subset of $L_x$, $L_h$) would indicate that there were features in the new data which were different (i.e., weakly correlated, or uncorrelated) from past articles. Thus, the corresponding right singular vectors (i.e., $R^t_{new}$) would represent the sentence structures associated with these new features. Consequently, this data may be isolated, enhanced, and visualized by passing the matrices $L_{new}$, $V_{new}$, and $R^t_{new}$ back to the Visualization & Interpretation Function.

The terms and expressions that are employed herein are terms or description and not of limitation. There is no intention in the use of such terms and expressions of excluding the equivalents of the feature shown or described, or portions thereof, it being recognized that various modifications are possible within the scope of the invention as claimed.

I claim:

1. A computer-implemented method for at least enhancing selected information contained in a data containing media, the method comprising the steps of:

receiving input data representing a textual document having a number of human-readable words;

compressing the input data into compressed data structures having information regarding a location and relative importance of elements of the input data with at least a subset of the compressed data structures being enhanced with respect to a remainder of the compressed data structures by modifying the subset of the compressed data structures;

expanding the compressed data structures; and displaying the expanded structures such that the expanded structures have an appearance of a polyhedron with the enhanced data structures being visually distinguishable from a remainder of data structures.

2. The method of claim 1, further comprising the steps of displaying a cursor within the displayed polyhedron and moving the cursor within the polyhedron in response to user input.

3. The method of claim 2, wherein the polyhedron is a rectangular prism.

4. The method of claim 1, further comprising the steps of displaying textual data as a slice through the solid.

5. The method of claim 4, wherein the polyhedron is a rectangular prism.

6. The method of claim 1, wherein the displaying step includes displaying the text as an opaque feature within the solid.

7. The method of claim 1, further comprising step of searching the expanded structures in response to a query for one or more features of interest.

8. The method of claim 1, wherein the polyhedron is a rectangular prism.

9. A system for at least enhancing selected information contained in a data containing media, the system comprising:

means for receiving input data representing a textual document having a number of human-readable words;

means for compressing the input data into compressed data structures having information regarding a location and relative importance of elements of the input data with at least a subset of the compressed data structures being enhanced with respect to a remainder of the compressed data structures by modifying the subset of the compressed data structures;

means for expanding the compressed data structures; and means for displaying the expanded structures in a manner such that the expanded structures have a multi-dimensional form at least three dimensions and with the enhanced data structures being visually distinguishable from a remainder of data structures.

10. The system of claim 9, wherein the three dimensional form is a rectangular prism.

11. The system of claim 9, wherein the displaying means displays a cursor movable within the three dimensional form.

12. The system of claim 9, wherein the displaying means displays the text as an opaque feature within the three dimensional form.

* * * * *